US007878549B2

(12) United States Patent
Simske et al.

(10) Patent No.: US 7,878,549 B2
(45) Date of Patent: Feb. 1, 2011

(54) PRINTED SUBSTRATE HAVING EMBEDDED COVERT INFORMATION

(75) Inventors: Steven J. Simske, Fort Collins, CO (US); David E. Auter, Fort Collins, CO (US); Andrew Fayette Page, Palo Alto, CA (US); Eddie A. Torres, Wilsonville, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1483 days.

(21) Appl. No.: 11/192,878

(22) Filed: Jul. 29, 2005

(65) Prior Publication Data

US 2007/0024915 A1 Feb. 1, 2007

(51) Int. Cl.

| | |
|---|---|
| ***G09C 1/00*** | (2006.01) |
| ***G09C 3/00*** | (2006.01) |
| ***B42D 15/00*** | (2006.01) |
| ***B42D 15/10*** | (2006.01) |

(52) U.S. Cl. ............................ 283/17; 283/72; 283/73; 283/74; 283/91

(58) Field of Classification Search ................ 235/494; 283/72, 73, 82, 91, 17, 74; 345/619; 380/51, 380/55; *B42D 15/00, 15/10; G06K 19/06, G06K 19/12, 19/14; G06T 11/00*

See application file for complete search history.

(56) References Cited

U.S. PATENT DOCUMENTS

| | | | | |
|---|---|---|---|---|
| 5,371,798 | A * | 12/1994 | McWhortor | 380/51 |
| 5,449,200 | A | 9/1995 | Andric et al. | |
| 5,904,375 | A | 5/1999 | Brugada | |
| 6,628,412 | B1 * | 9/2003 | Jeran et al. | 358/1.14 |
| 6,808,118 | B2 * | 10/2004 | Field | 235/494 |
| 7,533,817 | B2 * | 5/2009 | Ming et al. | 235/462.04 |
| 2003/0038974 | A1 | 2/2003 | Hu | |
| 2003/0121987 | A1 * | 7/2003 | Field | 235/494 |
| 2004/0145592 | A1 * | 7/2004 | Twersky | 345/619 |
| 2005/0142469 | A1 * | 6/2005 | Blood et al. | 430/10 |
| 2006/0202470 | A1 * | 9/2006 | Simske et al. | 283/74 |
| 2007/0273146 | A1 * | 11/2007 | Davis et al. | 283/72 |

FOREIGN PATENT DOCUMENTS

| | | |
|---|---|---|
| WO | WO 99/12742 | 3/1999 |

* cited by examiner

*Primary Examiner*—Dana Ross
*Assistant Examiner*—Justin V Lewis

(57) ABSTRACT

A method for embedding covert information on a printed substrate is provided. The method can include the steps of printing overt indicia on a substrate and generating a pattern of microtext representative of at least a portion of the overt indicia. Such microtext is capable of being printed in at least two distinct fonts, including a first font and a second font. The method can further include steps of varying the pattern of microtext such that at least one character of the pattern of microtext is configured to be printed in the first font and at least one character is configured to be printed in the second font, thereby providing a font variation which corresponds to a covert code, and printing the pattern of microtext which includes the font variation on the substrate.

22 Claims, 2 Drawing Sheets

PRINTED SUBSTRATE HAVING EMBEDDED COVERT INFORMATION

FIELD OF THE INVENTION

The present invention relates generally to printing technologies for embedding covert information on a substrate. More particularly, the present invention relates to printing technologies to thwart counterfeiting activities.

BACKGROUND OF THE INVENTION

The authentication of original documents has become a vital aspect of business, government, and other security sensitive areas. With the continuous use, re-use, and re-purposing of documents in electronic form, original documents in paper form can often be vital in proving the origin of various derivative documents. Such authentication has become particularly important as a result of the widespread availability of high quality, relatively inexpensive scanners, photo printers, and image editing software. It takes little skill for a counterfeiter to scan a document, edit the resulting image to suit a particular need, and print a copy. It has thus become trivial for counterfeiters to recreate original documents, and to produce copies that are nearly indistinguishable from the originals.

In many cases, original documents are required to prove ownership or authority. The trivial nature of copying documents can place valuable assets and rights at risk. In other cases, copies may be allowable as long as the distinction between the copies and the originals can be unequivocally maintained.

As such, it would be beneficial to provide a method for increasing the difficulty of producing counterfeited documents, especially for those criminals that lack a high level of technological expertise. Additionally, by increasing the level of counterfeiting difficulty, it is hoped that even highly skilled criminals will lack the resources to create illicit documents.

DETAILED DESCRIPTION OF THE PREFERRED EMBODIMENT(S)

Figure 1:
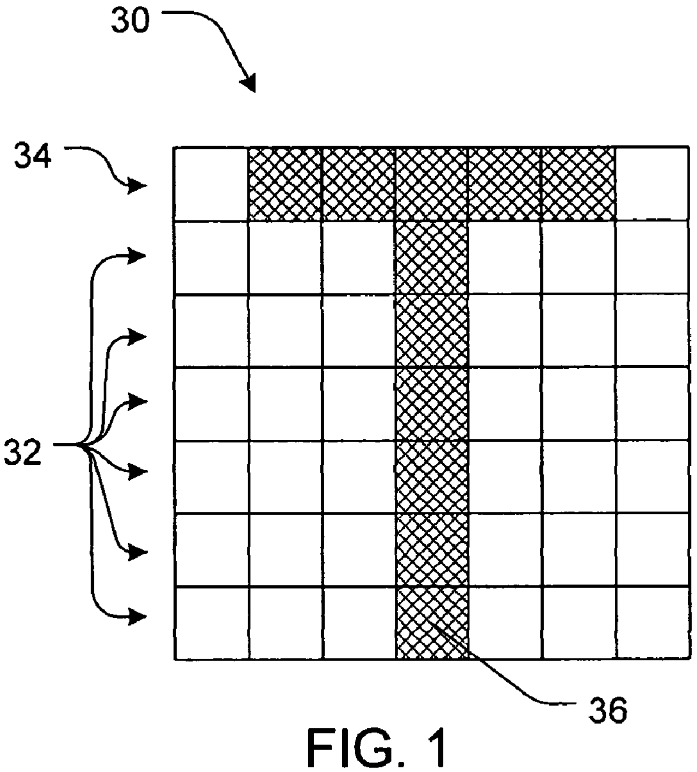
FIG. 1 is a graphical representation of a microtext symbol in accordance with an embodiment of the present invention.

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a variable" includes reference to one or more of such variables.

As used herein, the term "microtext" refers to markings that generally do not scan well with state of the art consumer scanners due to modulation transfer function (MTF) limitations. The micro-markings may be images, text, geometrical shapes, patterns, or any other markings known to one skilled in the art. Sizes may range from about a 4×4 pixel region to about a 12×12 pixel region; however any size that is beyond the MTF capabilities of 300 to 600 p.p.i. scanners would be considered to be within the scope of the present invention. Because of their small size and typically custom fonts, microtext markings or characters are difficult to recognize with an optical character recognition (OCR) system.

As used herein, "font variation" can refer changes in a font or fonts that differ by as little as one pixel. These variations can be any visibly discernable difference, including a change in the height, width, length, shape, color, etc.

As used herein, the term "visibly discernable" refers to one or more objects that can be visually distinguished from one another by a human or a machine. Naturally, the ability to discriminate between two objects differs between humans and machines, and therefore this term may vary depending on the authentication system being utilized.

The term "indicia" can refer to any readable characters, images, colors, etc. Characters are intended to include ASCII characters, alphabetic characters, numeric characters, alphanumeric characters, non-alphanumeric characters, Asian characters, non-romanized characters, punctuation symbols, or any other character or symbol known to one skilled in the art.

As used herein, the term "overt" refers to something that is observable, visible, or more easily distinguishable. Writing that can be easily read and understood is an example of overt.

As used herein, the term "covert" refers to something concealed, hidden, invisible, or not readily distinguishable. It can include things that can not be seen, and those that are difficult to see or to understand. Covert can also include visible objects that are in code, the meaning of which cannot be readily comprehended.

As used herein, the term "color tile" refers to a printed area of color. The area of color may be of any shape, including but not limited to, square, rectangular, circular, polygonal, irregular, etc. It is intended that the term "color" include the entire range of the visible spectrum, including traditional colors as well as black, white, and gray.

As used herein, the term "coded information" can be any information utilized to provide authentication of overt indicia. In some cases, the coded information can be in some way descriptive of the overt indicia. In other cases, the coded information can be unrelated to the overt indicia. For example, the coded information may be a well known or obscure phrase, or any other information that could be used to authenticate the overt indicia. It may also be a random or seemingly random string of symbol elements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Furthermore, such an interpretation should apply regardless of the breadth of the range or the characteristics being described.

Various techniques can be utilized to allow the authentication of original documents and other secure printed material. One such technique encompasses the ability to authenticate secure documents from covert security information located on the document. In this way, a recipient can easily pick out non-original documents when the originals have been marked with a covert code and the counterfeits lack such covert markings. As such, original documents can be authenticated and counterfeits or non-original copies can be discovered and eliminated. One method of providing such secure documents relates to providing a covert code within a pattern of microtext printed on the document. Because of the small size of the microtext, consumer-end printers have great difficulty reproducing them, and thus counterfeiting is thwarted due to the inability to generate documents containing both the overt microtext and the covert code contained therein. Through such techniques, a highly configurable coding system that allows the tracking, tracing, and authentication of secure printed material based on a combination of microtext and covert code can be realized.

Accordingly, a method of embedding covert information on a printed substrate is provided. The method can include steps of printing overt indicia on a substrate and generating a pattern of microtext representative of at least a portion of the overt indicia. Such microtext is capable of being printed in at least two distinct fonts, including a first font and a second font. The method can further include steps of varying the pattern of microtext such that at least one character of the pattern of microtext is configured to be printed in the first font and at least one character is configured to be printed in the second font, thereby providing a font variation which corresponds to a covert code. The pattern of microtext which includes the font variation can then be printed on the substrate.

In another aspect of the present invention, a printed substrate having embedded covert information is provided. The printed substrate can include a substrate having overt indicia printed thereon, a pattern of microtext representative of at least a portion of the overt indicia, the pattern of microtext being printed on the substrate, and a pattern of font variation in the pattern of microtext, with the pattern of font variation corresponding to a covert code.

The pattern of microtext can be printed in various spatial configurations relative to the overt indicia. In one aspect, the pattern of microtext can be in visual proximity to the overt indicia. It can also be in any orientation with respect to the substrate. It can be for example, without limitation, a continuous line, a column along one edge, organized into geometric regions such as squares, rectangles, circles, etc., printed upside down with respect to the overt indicia, or various combinations thereof. It is also contemplated that the pattern of microtext can be printed on a reverse side of the substrate from the overt indicia and thus would not be in visual proximity to the overt indicia. The microtext can also be printed so that it is inconspicuously concealed in a document letterhead or other branding indicator.

In one aspect, the pattern of microtext can be a hidden pattern of microtext. Any type of hidden or non-visible printing that allows the visualization or increases the discernability of the microtext only when particular conditions are met while viewing would be considered to be within the scope of the present invention. For example, the microtext can be printed with UV sensitive ink, and thus would be viewable only when exposed to UV radiation. As another example, the microtext can be printed using inks whereby the microtext is only discernable through a colored filter. Such hidden printing of the pattern of microtext can effectively increase the difficulty of counterfeiting secure printed material by further obscuring both the pattern of microtext and the covert code contained therein.

Various substrates are contemplated for inclusion within the scope of the present invention, including those associated with documents and non-documents. In one aspect, for example, the substrate can include a print media substrate suitable for printing a document. Documents are intended to include any printed material on a print media substrate, including purely textual documents, or documents including a mixture of text and images. Documents can also include printouts of software code; packaging materials, including inserts and labels; tickets and other single-used customized print items; magazines; coupons; postcards; stamps; etc. Various print media substrates are known to those skilled in the art, including, without limitation, paper, photo base, transparency, coated photo media, etc. In one aspect, the print media substrate can be paper. In another aspect of the present invention, the print media substrate can be a product package. In this way, a product can be authenticated by a covert code within a pattern of microtext printed on the packaging material associated with the product.

The pattern of microtext printed on a printed substrate can be used as a means of verifying that the overt indicia are authentic due to the relationship between the two. Microtext is also small enough to make reproduction difficult, thus thwarting counterfeiting attempts. In one aspect, the microtext can be a substantial copy of the overt indicia. As such, verification would only require an individual to magnify the microtext pattern and read the characters to ensure that the overt indicia were authentic. As an advantage to this relationship, the pattern of microtext can be utilized to reproduce the overt indicia. The pattern of microtext can be scanned or otherwise digitized in order to generate a copy of the overt indicia. Thus a copy of the printed substrate or document can be replicated solely from the pattern of microtext printed thereon. Such a reproduction can include all the formatting of the original document, allowing an identical copy to be produced, minus the microtext security feature. Alternatively, the pattern of microtext may itself be reproduced with the overt indicia, provided a printer capable of printing microtext is available. The entire portion or a limited portion of the overt indicia can be recreated in this way. It may also include only the overt indicia with none of the formatting of the original. In one aspect, the overt indicia can be identically recreated from the pattern of microtext. In another aspect, the overt indicia can be substantially recreated from the pattern of microtext. Such replication, in combination with the covert code authentication of the font variation, provides document security/authentication while at the same time providing an effective means of producing non-original copies by authorized users.

Microtext can be any character, small symbol, glyph, image, marking, etc., known to one skilled in the art, including, without limitation, ASCII characters, alphabetic characters, numeric characters, alphanumeric characters, non-alphanumeric characters, Asian characters, punctuation symbols, or any other character or symbol known to one skilled in the art. In one aspect, the microtext can include ASCII characters. The remainder of the specification will refer exclusively to microtext as ASCII characters. It should be noted that this is for ease of discussion, and that any form of microtext can be substituted for the ASCII characters.

Microtext can be of any size that provides the security and authentication benefits of the present invention. As has been described herein, microtext characters are generally beyond the MTF (modulation transfer function) of most scanners, and print poorly on most 300 to 600 d.p.i printers, including dry electrophotography (DEP) and inkjet models. In addition to the size ranges described above, microtext characters may useful in a range of from about 7 by 7 pixels to about 12 by 12 pixels at, for example, 320 dots/cm or 812.8 dpi. This range provides a sufficient pixel grid to allow variability in the pixel font while at the same time precluding optical character recognition (OCR) technologies from reading the microtext. It should be noted, however, that any size microtext small enough to preclude commercial OCR technologies from successfully reading them is considered to be within the scope of the present invention. For example, microtext smaller than 7 by 7 pixels are considered to be within the scope of the present invention, particularly for situations where extensive variability in the microtext fonts is not required.

One method of defining microtext characters can utilize an XML code. It should be noted that this XML code is not intended to be limiting, and any other means of defining microtext known to one skilled in the art is considered to be within the scope of the present invention. In the following code, <Yrange> counts keeps track of how many line segments are written at each row of the microtext. There are two counts for each line segment. For example, a “T” has a single line segment at each row, while a “U” has a single line segment for the first row, and two line segments for each other row (i.e. one for each side of the “U.”) The <X> values mark the start and end points (in pixels) of these line segments. The microtext definitions are fully digital, and should not be scaled as in Bezier/SVG text typical of regular font families. FIG. 1 shows a 7×7 pixel grid 30 depicting a microtext character “T.” Note that each row exemplified at 32 contains a single line segment comprised of a single colored pixel 36. One of the rows exemplified at 34 contains a single line segment comprised of 5 colored pixels. An XML definition of the character is as follows:

```
<Character Value=“T”>
    <Yrange Count=“2”/>
    <Yrange Count=“4”/>
    <Yrange Count=“6”/>
    <Yrange Count=“8”/>
    <Yrange Count=“10”/>
    <Yrange Count=“12”/>
    <Yrange Count=“14”/>
    <X Value=“3”/>
    <X Value=“4”/>
    <X Value=“3”/>
    <X Value=“4”/>
    <X Value=“3”/>
    <X Value=“4”/>
    <X Value=“3”/>
    <X Value=“4”/>
    <X Value=“3”/>
    <X Value=“4”/>
    <X Value=“3”/>
    <X Value=“4”/>
    <X Value=“1”/>
    <X Value=“6”/>
</Character>
```

Figure 2:
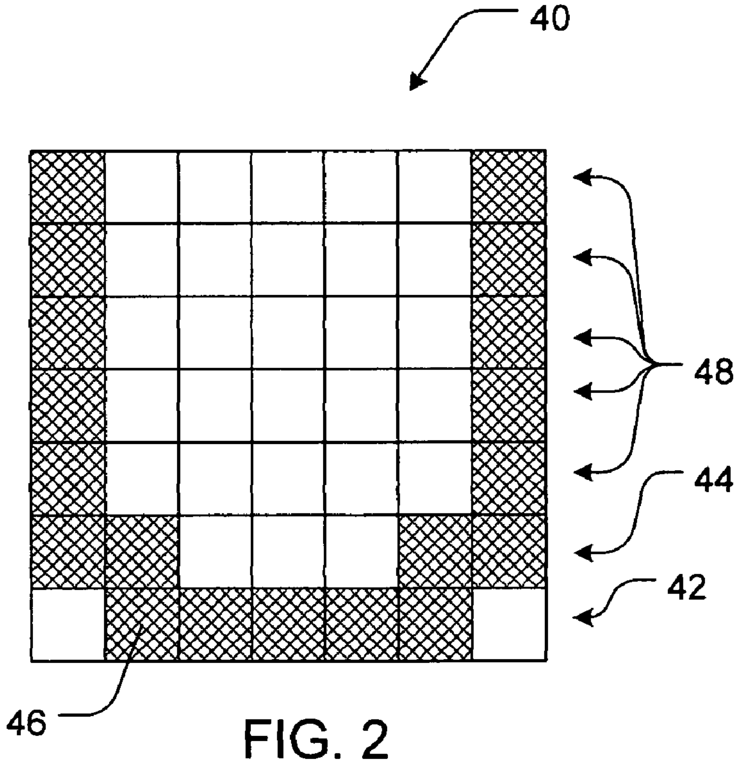
FIG. 2 is a graphical representation of an alternative microtext symbol in accordance with an embodiment of the present invention.

FIG. 2 shows a 7×7 pixel grid 40 depicting a microtext character “U.” Note that the row exemplified at 42 contains a single line segment comprised of 5 colored pixels 46. The row exemplified at 44 contains two line segments comprised of two colored pixels each, and the remaining rows exemplified at 48 contain two line segments comprised of one pixel each. An XML definition of the character is as follows:

```
<Character Value=“U”>
    <Yrange Count=“2”/>
    <Yrange Count=“6”/>
    <Yrange Count=“10”/>
    <Yrange Count=“14”/>
    <Yrange Count=“18”/>
    <Yrange Count=“22”/>
    <Yrange Count=“26”/>
    <X Value=“1”/>
    <X Value=“6”/>
    <X Value=“0”/>
    <X Value=“2”/>
    <X Value=“5”/>
    <X Value=“7”/>
    <X Value=“0”/>
    <X Value=“1”/>
    <X Value=“6”/>
    <X Value=“7”/>
    <X Value=“0”/>
    <X Value=“1”/>
    <X Value=“6”/>
    <X Value=“7”/>
    <X Value=“0”/>
    <X Value=“1”/>
    <X Value=“6”/>
    <X Value=“7”/>
    <X Value=“0”/>
    <X Value=“1”/>
    <X Value=“6”/>
    <X Value=“7”/>
    <X Value=“0”/>
    <X Value=“1”/>
    <X Value=“6”/>
    <X Value=“7”/>
</Character>
```

Interconverting from XML for a microtext character and the raster representations shown in FIGS. 1 and 2 can be implemented using the following code:

```
for (j = 0; j < height; j++)
{
  if (j ==0)
  {
    for (x = 0; x<yrange [0]; x += 2)
    {
      for (i = xarray[x]; i<xarray [x + 1]; i++)
        bitmap.SetPixel (i, height−1−j, color1);
    }
  }
  else
  {
    for (x = yrange[j − 1]; x<yrange[j]; x += 2)
    {
      for (i = xarray[x]; i<xarray [x + 1]; i++)
        bitmap.SetPixel (i, height−1−j, color1);
    }
  }
}
```

The term height-1-j is used in place of j because, for most raster renderers, the axes are not Cartesian, but rather, the y-origin is at the top.

Figure 3:
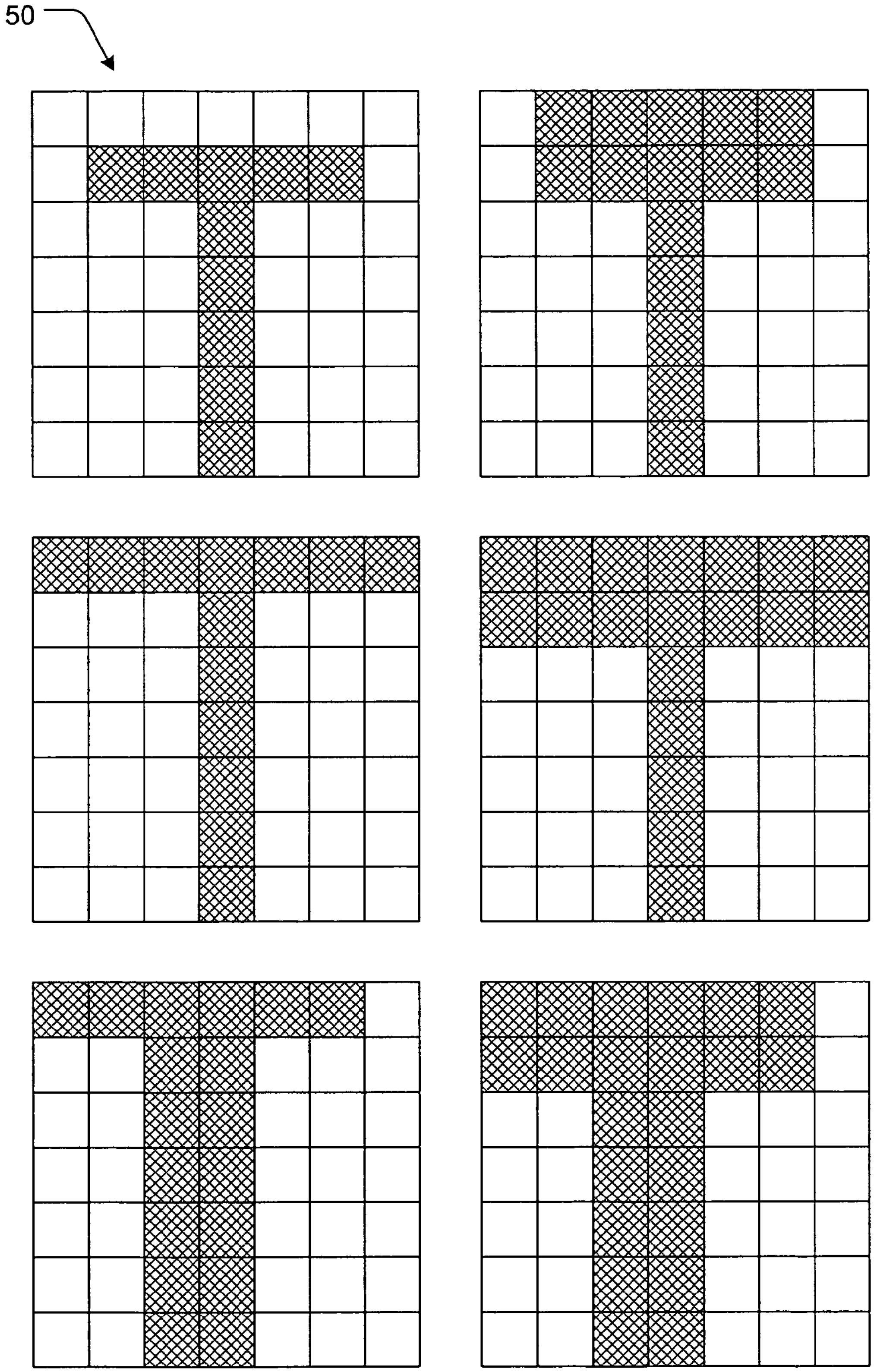
FIG. 3. is a graphical representation of various potential font variations for a microtext character in accordance with an embodiment of the present invention.

In addition to overt verification, the pattern of microtext can also include a covert code for authentication of the overt indicia. In one aspect of the present invention, the covert code embedded in the pattern of microtext can include font variations of microtext characters. The font of a particular microtext character can be modified in various ways, with the complexity of the variations, and thus the number potential fonts, increasing with the number of pixels used to display the character. Because the microtext can be displayed in arrays as shown in FIGS. 1 and 2, and because the microtext can be deposited pixel by pixel with printing processes such as liquid electrophotography (LEP), numerous font definitions for each character can be implemented. For example, FIG. 3 provides six non-limiting alternate representations 50 of a capital letter "T." These font variations can be utilized as a covert code to embed covert information into the pattern of microtext. In addition to font variations, spatial relations between microtext characters can be varied within the microtext pattern to further provide variability to the covert code.

Different patterns of font variations across the pattern of microtext are contemplated. In one aspect, all occurrences of a particular microtext character within the pattern of microtext can be of the same font. For example, all occurrences of the microtext character "e" may be the same font. This aspect minimizes the chances of losing the covert code due to illegibility of a portion of the pattern of microtext. Other aspects are contemplated, however, wherein the covert code can be encoded in the order of the font variations starting with a particular character. In cases such as these, a particular microtext character can have multiple fonts within the same pattern of microtext.

The covert information encoded by the covert code can be any information that can be utilized to authenticate the overt indicia. In one aspect, the covert code can be related to the overt indicia. This can be useful due to the ability to rapidly authenticate the printed substrate by an individual in possession of both the key to the covert code and the overt indicia. In other words, this aspect allows the authentication of the printed substrate without the need for conveying the covert information. For example, the covert code can be related to features of the overt indicia such as, without limitation, overt indicia length, number of lines, number of characters, font or size of the overt indicia, location of the overt indicia on the substrate, spatial organization such as margins, headings, etc., overt indicia color, HTML or other code defining the layout or other aspect of the overt indicia, encoded overt indicia, and combinations thereof. In one aspect, the HTML code defining the spatial layout of the overt indicia can be covertly coded into the font variations of the microtext. A unique identifier of a template used to organize the overt indicia can also be covertly coded into the microtext as described herein. In other aspects, the overt indicia may be encoded and represented in the covert code. Any of these characteristics can be encoded in the font variations of the pattern of microtext, thus allowing an authorized user to view the overt indicia and verify the covert code.

In another aspect of the present invention, the covert code is related to the creation of the overt indicia. Details relating to the creation of the overt indicia can include any creation feature that would be useful in the authentication of the overt indicia on the printed substrate. Examples can include, without limitation, creation date, creation time, printing date, printing time, author identification, printing location, printer identification, and combinations thereof. It should be noted that the creation feature can also be part of the overt indicia, or in other words, it can be included on the printed substrate. For example, the identification of the author and/or the creation date can be printed overtly on the printed substrate.

In a further aspect, the method can comprise a step of establishing the key configured to authenticate the printed substrate by matching the font variation to the covert code. Through the use of such a key, an authorized user can obtain the printed substrate and authenticate it by matching the font variation of the pattern of microtext with the covert code. The key can be embodied as information in an electronic file, information printed on a substrate, verbally transmitted information, or any other means of conveying such information known to one skilled in the art. In one aspect, the key can be included with the printed substrate, or even printed thereon. In these cases it may be beneficial for the key to be covert and/or encrypted.

Various methods of employing the covert code and the key can be contemplated by one skilled in the art. In one aspect of the present invention, a method of using a printed substrate as described herein is provided. The method can comprise steps of establishing a key configured to authenticate the overt indicia by matching the pattern of font variation to the covert code, and comparing the font variation to the covert code to authenticate the overt indicia. In other words, the key provides an authorized user with the information required to determine how the various patterns of font variations relate to the covert code. The overt indicia can be obtained by the authorized user in situations where the owner or possessor of the printed substrate is not in possession of the key. In other aspects, the owner or possessor of the printed substrate can be in possession of the key. Also, the overt indicia can be generated by the authorized user of the key, or they can be generated by another.

The ability to periodically alter a covert code within a system having a very high number of combinations to thwart counterfeiters can be highly useful. A large number of microtext font "families" can be generated by the methods disclosed herein, and thus accomplish this goal. For example, if 256 ASCII characters can be encoded in seven different ways, there are then $7^{256}$ possible representations of data in the font families used. In practice, however, many documents will have less than the full 256 ASCII character set, so the number of possibilities can be somewhat lower.

Microtext can be utilized in a wide variety of ways, some of which can increase the variability of the authentication system. In one aspect, at least a portion of the pattern of microtext can be printed in association with at least one color tile. In another aspect, the pattern of microtext can be printed on a plurality of color tiles. Printing the pattern of microtext in association with a plurality of color tiles can greatly increase the counterfeiting protections disclosed herein. Microtext characters thwart counterfeiters because they can be printed with a LEP printer pixel by pixel, with very little variance in the color, e.g. hue, saturation, etc. Color tiles printed in this manner increase the difficulty of counterfeiting because each color tile can be printed with a very specific hue. It is generally beyond the capability of non-LEP printers to reproduce color hues with such specificity. When color is used as part of the covert coding system, counterfeiters have a very difficult time matching the correct color hues without access to an extremely expensive LEP printer, and thus, cannot generate the color tiles. Additionally, the ability to produce very precise color hues with low variability eliminates the need for an analogue statistical determination in the authentication of color hue, but rather allows for a digital color authentication system.

EXAMPLE

As has been described herein, numerous types of information can be encoded in the font variations of the pattern of microtext for the purpose of authenticating the overt indicia. In one example, however, the time of creation of the overt indicia after Jan. 1, 2000 can be used. ASCII characters are chosen that can be printed with multiple font variations. Characters such as periods and commas are excluded. As an example, the 64 characters as follows can be used: "A," "B," . . . , "Z," "a," "b," . . . , "z," "0," "1," . . . , "9," "&" and "%".

The characters are ranked based on their occurrence in the language of the overt indicia. For example, the English characters, "e," "t," "a," "o," "n," "i" and "s" occur more frequently in writing than "q," "j," "x" and "z". These values can be estimated by one skilled in the art if the ranking is not available for a given language. Time intervals are then assigned to the characters based on this relative frequency. As an example, if relative occurrence of the 64 characters is as follows: "e," "t," "A," "T," "a," "o," "1," . . . , "Q," then one assignment of time intervals can be as shown in Table 1.

TABLE 1

| Character | Number of Fonts | Time Interval |
|---|---|---|
| e | 8 | 25 years |
| t | 8 | 3.125 years |
| A | 7 | 163.058 days |
| T | 7 | 23.294 days |
| a | 7 | 3.3277 days |
| o | 4 | 19.9662 hours |
| 1 | 6 | 3.3277 hours |
| . . . | . . . | . . . |
| Q | 8 | <10-40 seconds |

Table 1 shows an example of how a 200-year time scale is encoded. Very precise times within a 200 year period can be encoded utilizing this method. The time interval is solely for illustrative purposes and any alternative time interval or other information can be encoded in a similar manner. Each character represents a particular time scale which subdivides the preceding larger time scale. For example, since there are 8 different font representations of the "e" character, the font chosen can subdivide the 200 year time interval by 25 years. The character "t" has 8 distinct fonts, so the various fonts can represent 8 intervals of the preceding 25 year time scale, i.e., 3.125 years each.

Zero can be used as the sequence index for the fonts to simplify the decoding of the time of creation. So, if there are 8 "e" fonts, they can be indexed as "0," "1," . . . , "7". As an example, if the font for "e" is 0, and the font for "t" is 1, then the time is Jan. 1, 2000+0*(25 years)+1*(3.125 years). Thus, the time of creation can be obtained incrementally by multiplying the sequence index for the particular font by the time interval for that microtext character and summing. The relative occurrence of the characters ("e," "t," "A," etc.) can be used to increase the accuracy of the authentication. The greater the relative occurrence of a character, the greater the chance that the particular font can be distinguished.

Because not all of a set of characters necessarily occur in every document, the next present character can subdivide the interval for the missing character. For example, if "A" and "T" were both absent, then the "a" character would subdivide the 3.125 year interval to 163.058 days of resolution.

Also, characters not needed to encode the time scale to the required resolution can be used to encode other forms of information or metadata such as the creator, author, etc, simply by encrypting the font variations to represent ASCII character sequences.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of embedding covert information on a printed substrate, comprising steps of:

printing overt indicia on a substrate;

generating a pattern of microtext representative of at least a portion of the overt indicia, the microtext being capable of being printed in at least two distinct fonts, including a first font and a second font;

varying the pattern of microtext such that at least one character of the pattern of microtext is configured to be printed in the first font and at least one character is configured to be printed in the second font, thereby providing a font variation which corresponds to a covert code; and printing the pattern of microtext which includes the font variation on the substrate.

2. The method of claim 1, wherein the step of varying the pattern of microtext further includes varying the spatial relations between characters.

3. The method of claim 1, wherein all occurrences of a particular microtext character within the pattern of microtext is of the same font.

4. The method of claim 1, wherein the covert code is related to the overt indicia.

5. The method of claim 4, wherein the covert code is related to the overt indicia with respect to at least one feature selected from overt indicia length, number of lines, number of characters, font or size of the overt indicia, location of the overt indicia on the substrate, spatial organization, overt indicia color, HTML codes, codes defining a layout or other aspect of the overt indicia, encoded overt indicia, and combinations thereof.

6. The method of claim 1, wherein the covert code is related to the creation of the overt indicia.

7. The method of claim 6, wherein the covert code is related to the creation of the overt indicia with respect to at least one creation feature selected from creation date, creation time, printing date, printing time, author identification, printing location, printer identification, and combinations thereof.

8. The method of claim 1, further comprising a step of establishing a key configured to authenticate the printed substrate, the key enabling decoding of the covert code from the font variation.

9. The method of claim 1, further including a step of identically recreating the overt indicia from the pattern of microtext.

10. The method of claim 1, further including a step of substantially recreating the overt indicia from the pattern of microtext.

11. The method of claim 1, further comprising a step of printing a plurality of color tiles in association with the pattern of microtext.

12. A printed substrate having embedded covert information, comprising:

a substrate having overt indicia printed thereon;

a pattern of microtext representative of at least a portion of the overt indicia, the pattern of microtext being printed on the substrate; and a pattern of font variation in the pattern of microtext, the pattern of font variation corresponding to a covert code.

13. The printed substrate of claim 12, wherein the pattern of microtext is in visual proximity to the overt indicia.

14. The printed substrate of claim 12, wherein the pattern of microtext is a hidden pattern of microtext.

15. The printed substrate of claim 14, wherein the hidden pattern of microtext is capable of being rendered discernable when associated with a colored filter.

16. The printed substrate of claim 14, wherein the hidden pattern of microtext is capable of being rendered discernable under ultraviolet light.

17. The printed substrate of claim 12, wherein the substrate is a print media substrate.

18. The printed substrate of claim 12, wherein the pattern of microtext is a substantial representation of substantially all the overt indicia.

19. The printed substrate of claim 12, further comprising color tiles associated with the pattern of microtext.

20. A method of using the printed substrate of claim 12, comprising steps of:

establishing a key configured to authenticate the overt indicia, the key enabling decoding of the covert code from the font variation; and comparing the font variation to the key to authenticate the overt indicia.

21. The method of claim 20, further including a step of obtaining the overt indicia.

22. The method of claim 20, further including a step of generating the overt indicia.

* * * * *